Sept. 25, 1956    D. A. MURPHY    2,764,428
WASH PIPE MOUNTING FOR SWIVELS
Filed Jan. 26, 1951    3 Sheets-Sheet 1
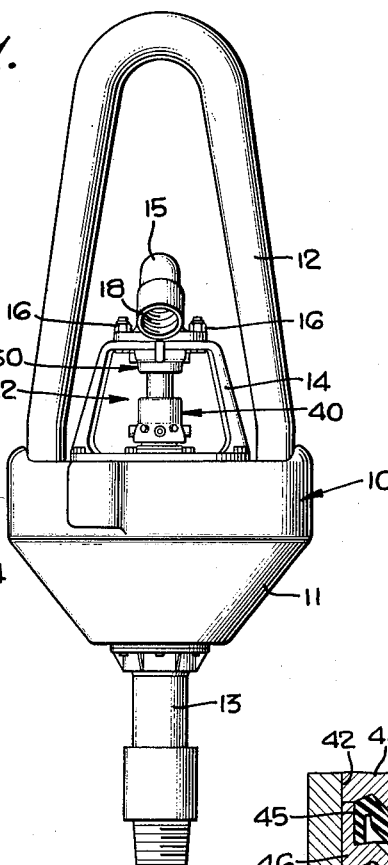
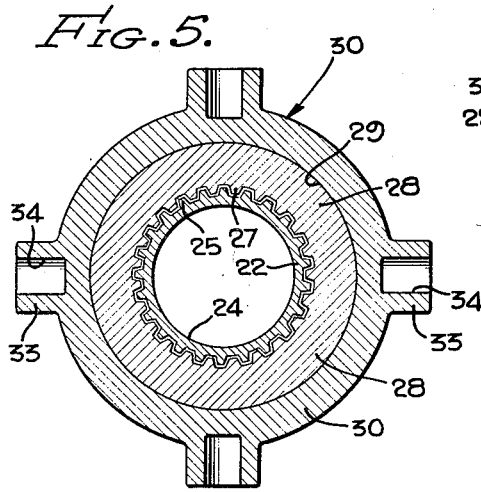
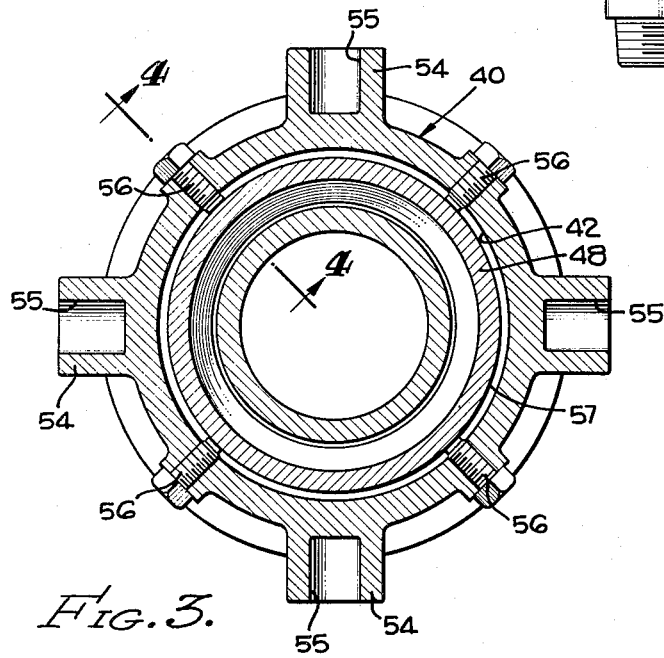
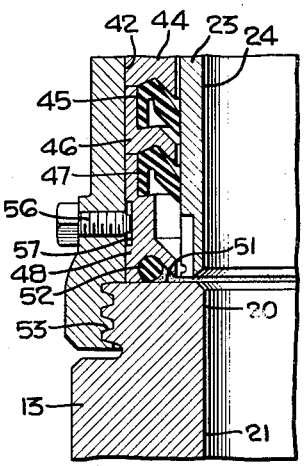
DEMERY A. MURPHY,
INVENTOR.
BY Lyon+Lyon
ATTORNEYS

DEMERY A. MURPHY,
INVENTOR.

BY Lyon & Lyon
ATTORNEYS

United States Patent Office 2,764,428
Patented Sept. 25, 1956

2,764,428

WASH PIPE MOUNTING FOR SWIVELS

Demery A. Murphy, Torrance, Calif., assignor to The National Supply Company, Pittsburgh, Pa., a corporation of Pennsylvania Application January 26, 1951, Serial No. 207,908

3 Claims. (Cl. 285—165)

This invention relates to well drilling apparatus and is particularly directed to improvements in the wash pipe and packing assemblies used in hydraulic rotary swivels. One of the functions of well drilling swivels of this type is to transmit drilling mud fluid under pressure from a nonrotary part of the swivel to a rotating part thereof which is connected to the rotary stem. Swivels commonly employ a relatively short tubular element which may be fixed to either the rotating or nonrotating portion of the swivel, and suitable packing means is provided for packing the joint between the tubular member and the other portion of the swivel. This tubular element or "wash pipe" as it is known in the art may be fixed to either the nonrotary portion or the rotary portion of the swivel. In either event, any misalignment which may be initially present or which may develop after a period of use between the rotary and nonrotary portions of the swivel has an adverse effect upon the packing assembly leading to premature failure.

In accordance with my invention, I provide a wash pipe which may be nonrotatably associated with either the rotary or nonrotary portions of the swivel, but which may tilt and gyrate with respect to either or both of said swivel portions to accommodate misalignment. The wash pipe is not fixed against axial movement but can move axially for sufficient distance to avoid binding as it tilts and gyrates. The wash pipe finds its own axis of alignment independently of any misalignment which may exist between the rotating swivel sleeve and the nonrotating gooseneck support. As an additional feature, the packing box may also be mounted so that it may float and accommodate limited misalignment of the wash pipe.

It is accordingly the principal object of my invention to provide an improved form of wash pipe and packing assembly for a rotary swivel which has longer service life because of its ability to operate under conditions of misalignment between the rotating and nonrotating parts of the swivel. Other and more detailed objects will appear hereinafter.

In the drawings:

Figure 1 is a side elevation of a hydraulic rotary swivel of the general type to which my invention appertains.

Figure 3 is a horizontal sectional view taken substantially on the line 3—3 as shown in Figure 2.

Figure 4 is a sectional detail taken substantially on the line 4—4 as shown in Figure 3.

Figure 5 is a horizontal sectional view taken substantially on the line 5—5 as shown in Figure 2.

Figure 2:
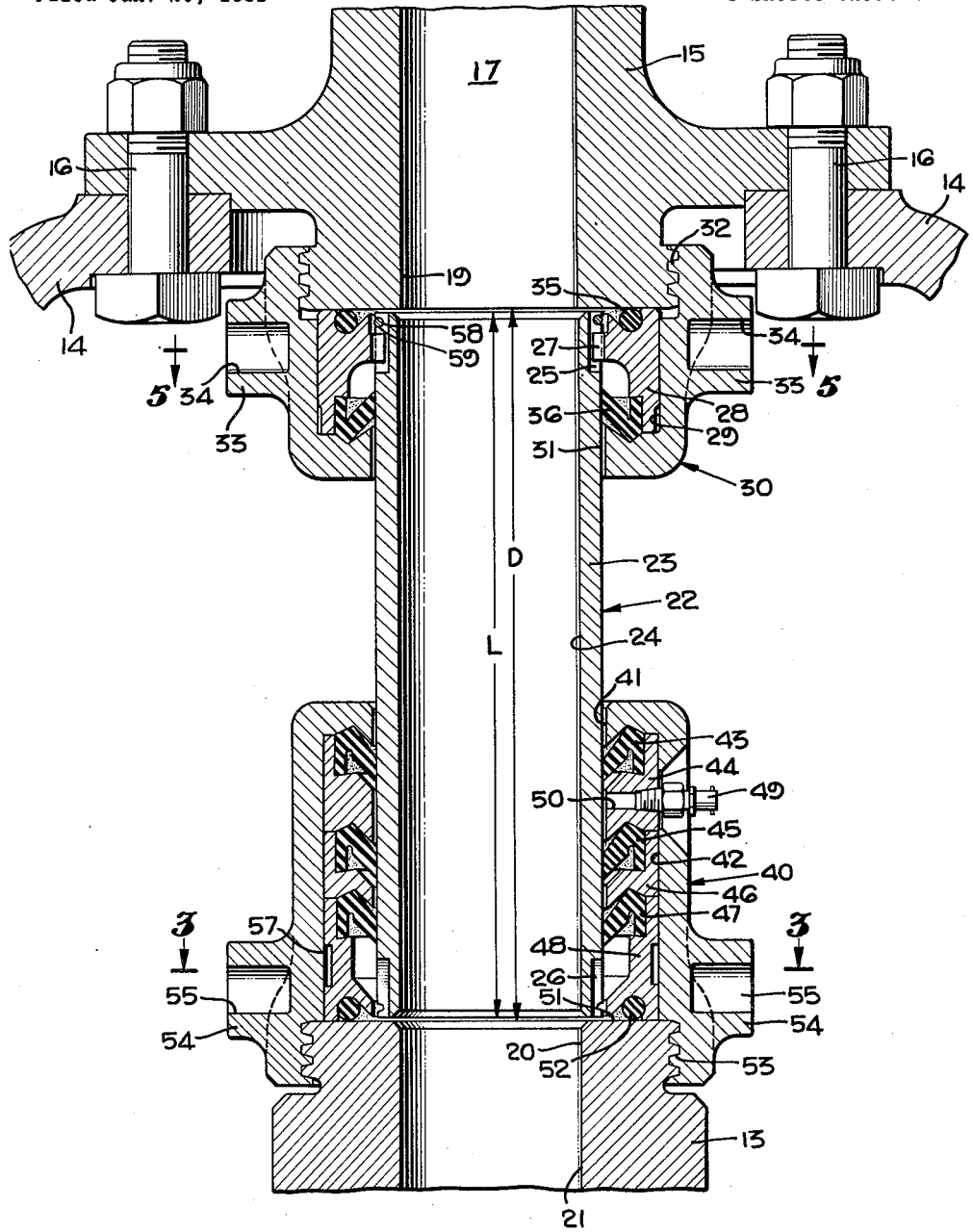
Figure 2 is a sectional elevation through the wash pipe packing assembly of the swivel shown in Figure 1, and illustrating one embodiment of my invention.

Referring to the drawings, the hydraulic rotary swivel 10 includes a body or housing 11 suspended by a bail 12 and rotatably supporting a rotary sleeve 13 by means of bearings (not shown). A support 14 is fixed relative to the housing 11. The gooseneck 15 is secured to this support by means of bolts 16. The gooseneck 15 has a central passage 17 terminating at one end in an internal thread 18 for connection with a hose (not shown). The other end 19 of the central passage 17 is aligned with and spaced from the upper end 20 of a similar passage 21 extending axially through the rotary sleeve 13. A wash pipe packing assembly generally designated 22 serves as a replaceable device for connecting the aligned passages 17 and 21 in the nonrotary gooseneck 15 and rotary sleeve 13 respectively.

In accordance with my invention I provide a tubular wash pipe 23 having a central passage 24. The ends of the wash pipe 23 are each provided with a series of external spline teeth 25 and 26. A corresponding mating series of internal spline teeth 27 are provided on the annular ring 28. The inter-engaging splines 25 and 27 prevent relative rotation but permit limited axial movement between the wash pipe 23 and the annular ring 28. Furthermore, the splines 25 and 27 are very short in length as compared to the diameter of the wash pipe 23, and hence the clearance between the splines allows the wash pipe to have limited angular or gyratory movement with respect to the ring 28. Thus the axis of the lower end of the wash pipe 23 may travel in a circle of small diameter without causing binding between the splines 25 and 27. The splines 25 are cut in the outer portion of the wall of the wash pipe 23 and do not extend to the inner surface of the wash pipe. The inner surface or bore of the wash pipe is thus smooth and projection-free in the regions of the splines 25 so that a minimum of turbulence in the mud fluid occurs. The splines 25 are thus protected from erosion by contact with the moving stream of mud.

The annular ring 28 is mounted within a counterbore 29 provided in a clamping nut or packing box 30. A central bore 31 in the packing box 30 permits the wash pipe 23 to extend through the packing box. The packing box 30 is connected to the wash pipe by means of interengaging threads 32. Bosses 33 on packing box 30 are formed with openings 34 to receive a bar (not shown) for turning the box 30 and threading it into position relative to the gooseneck 15. An O ring is provided to prevent leakage of fluid between the gooseneck 15 and annular ring 28. A packing ring 36 is clamped between the annular ring 28 and the packing box 30 and engages the outer surface of the wash pipe 23 to prevent leakage. While the wash pipe 23 does not rotate with respect to the packing ring 36 it does have relative oscillating movement with respect thereto in the event that the lower end of the wash pipe travels in a circular path caused by misalignment of the rotating and stationary parts of the swivel. I have found that a nonferrous metal such as aluminum may be employed to advantage for constructing the annular ring 28; the splines 27 give good service when engaged with the splines 25 on the steel wash pipe 23.

The lower end of the wash pipe 23 is encircled by a packing box 40. A central opening 41 in the packing box receives the wash pipe 23 and an axial bore 42 is provided to receive the packing elements 43, 44, 45, 46, 47 and 48. The elements 43, 45 and 47 may be identical with the packing ring 36 and each has a lip engaging the outer surface of the wash pipe 23 to form a rotary seal. Element 44 is a lantern ring serving to space packing rings 43 and 45. The lantern ring 44 may also be provided with a grease fitting 49 communicating with the outer surface of the wash pipe 23 by way of the aperture 50. Element 46 is a spacer ring serving to maintain the packing rings 45 and 47 in operative position. Element 48 is an annular ring which engages the upper surface 51 on the rotary sleeve 13. An O ring 52 is provided to prevent leakage of mud fluid between the annular ring 48 and the rotary sleeve 13.

The packing box 40 is connected to the rotary sleeve 13 by means of threads 53. A plurality of bosses 54 on the packing box 40 may be provided with central openings 55 to receive a bar (not shown) for turning the packing box 40 and bringing it into operative position with respect to the rotary sleeve 13. Screw elements 56 may be threaded radially into the packing box 40 so that their inner ends enter into the annular groove 57 provided in the ring 48. The purpose of these screw elements 56 is to prevent disassembly of the packing elements within the box 40 when the box 40 is disconnected from the rotary sleeve 13.

In operation the rotary sleeve 13 turns the packing box 40 while the wash pipe 23 does not turn. The packing rings 43, 45 and 47 turn with the box 40. Any misalignment between the axis of the rotating box 40 and the axis of the stationary box 30 causes the lower end of the wash pipe to travel in a circular path. This action is reflected in a wobble or gyratory movement of the wash pipe 23 with respect to the annular ring 28, and the splines 25 and 27 accommodate this wobble without binding and without excessive wear. Since the overall length "L" of the wash pipe 23 is less than the distance "D" between the gooseneck and rotary sleeve, the wash pipe is not fixed axially but is free to wobble or gyrate without binding. The packing rings 43, 45 and 47 may be replaced when worn, and if the outer surface at the lower end of the wash pipe which is engaged by said packing rings becomes worn, the wash pipe 23 may be inverted end for end so that the splines 26 engage the splines 27. The wash pipe may then be run with a new set of packing rings in the lower box 40 and thus the service life of the wash pipe 23 may be doubled. A retainer ring 58 positioned within a groove 59 on the wash pipe 23 may be provided to prevent disassembly of the parts.

Figure 6:
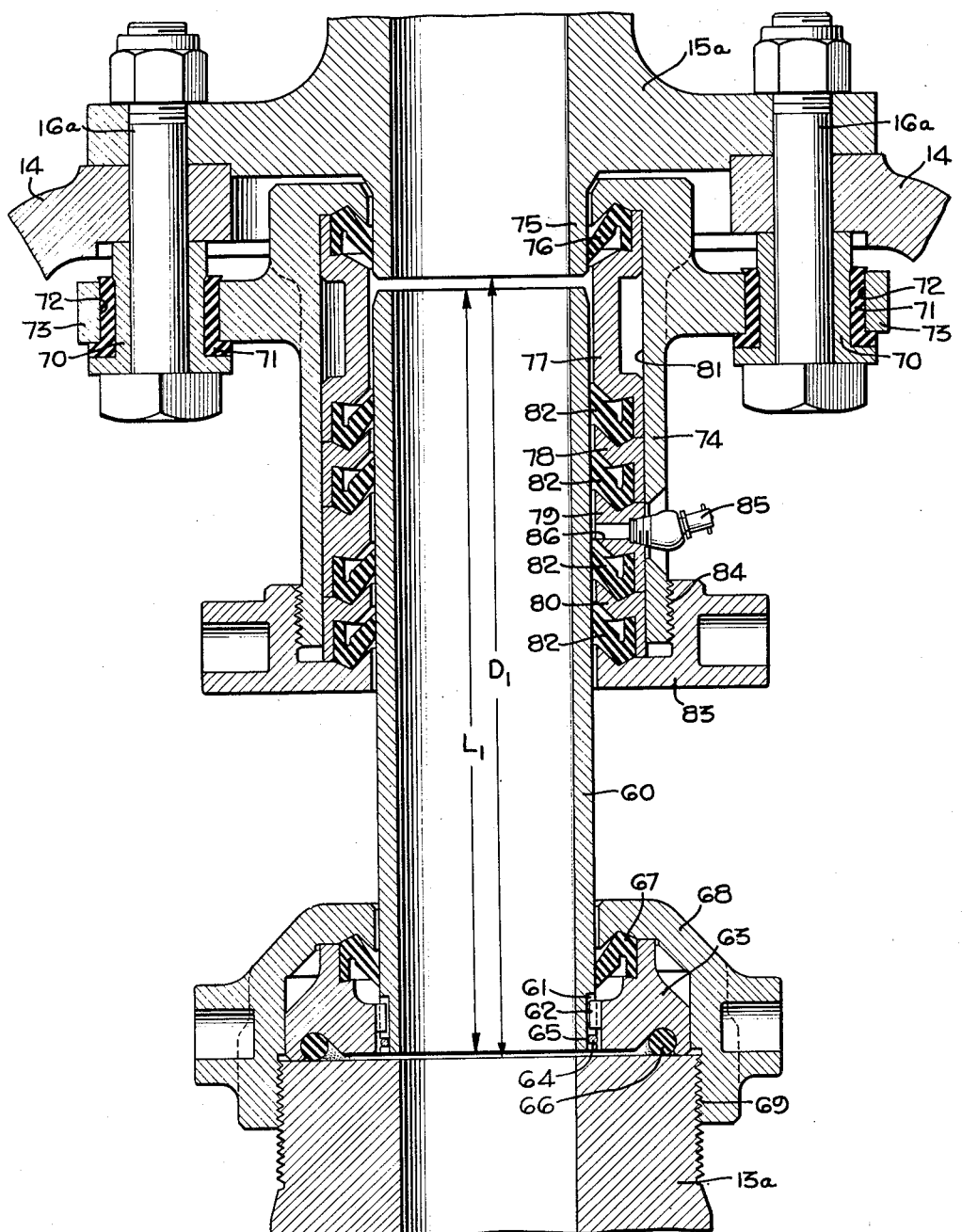
Figure 6 is a view similar to Figure 2 illustrating another form of my invention.

The wash pipe packing assembly 22 is removed and replaced laterally with respect to the rotary axis of the sleeve 13. After the packing boxes 30 and 40 have been disconnected from the gooseneck and rotary sleeve respectively, they are moved axially along the wash pipe until they are wholly positioned between planes defined by the ends of the wash pipe 23. The assembly 22 may then be removed laterally from operative position. The form of my invention shown in Figure 6 provides a full floating mounting for the wash pipe since it is free to oscillate or wobble not only at the end where the splines are engaged but also at the end where the large packing box encircles the wash pipe. As shown in Figure 6 the wash pipe 60 is provided with a series of external splines 61 adjacent its lower end, and these external splines engage a corresponding series of internal splines 62 provided on the annular ring 63. The construction and location of the inter-engaging splines 61 and 62 is similar to that described above in connection with splines 25 and 27. The splines 61 are cut into the outer wall of the wash pipe 60 and thus are out of the path of the moving mud fluid as it passes from the wash pipe into the rotary sleeve 13a. A retainer ring 64 may be positioned in a circular groove 65 to prevent disassembly of the parts. An O ring 66 positioned between the annular ring 63 and rotary sleeve 13a prevents leakage of mud fluid at that point. The packing ring 67 carried by the annular ring 63 has a sealing lip which engages the outer surface of the wash pipe 60 to prevent leakage. The clamping nut or packing box 68 is connected to the rotary sleeve 13a by means of threads 69 and serves to clamp the annular ring 63 in position and to deform the seals 66 and 67 into operative position. While the wash pipe 60 does not rotate with respect to the annular ring 63 it may have oscillatory or wobbling movement with respect to the packing ring 67 in the event of misalignment between the rotary sleeve 13a and the nonrotary gooseneck 15a. The overall length "L₁" of the wash pipe 60 is less than the distance "D₁" between the gooseneck and rotary sleeve, and hence the wash pipe is not fixed axially, but is free to wobble or gyrate without binding.

The gooseneck 15a is carried on the support 14 and clamped by means of the bolts 16a. The bolts 16a also clamp nonresilient flanged sleeves 70 against the support 14. A yieldable rubber-like bushing 71 encircles each of the sleeves 70 and is confined within an opening 72 provided in one of a pair of laterally extending arms 73. The arms 73 are fixed integrally on the packing box 74 and serve to support it in operative position. The upper end of the packing box 74 encircles a tubular extension 75 provided on the gooseneck 15a and a packing ring 76 within the box 74 engages the outer surface of the tubular extension 75 to form a seal. There is no relative rotation between the tubular extension 75 and the box 74 but the box may have oscillatory or wobbling movement with respect to the tubular extension 75 in the event that the rotary and nonrotary parts of the swivel are not in precise axial alignment. Nonresilient spacer rings 77, 78, 79 and 80 are positioned within the bore 81 of the packing box 74 and serve to hold the packing rings 76 and 82 in operative position. The nut 83 is connected to the packing box 74 by means of threads 84 and serves to clamp the spacers and packing rings in place. The spacer 79 may be provided with a lubricant fitting 85 for introducing grease or other lubricant into the interior of the packing box through aperture 86.

The laterally extending arms 73 carried on the resilient bushings 71 provide a self-aligning mounting for the packing box 74, permitting it to wobble or gyrate as the rotary sleeve 13a and wash pipe 60 turn relative to the gooseneck 15a. The wash pipe and packing box 74 may thus find an axis of alignment independently of any misalignment that may exist between the rotating sleeve 13a and the gooseneck 15a.

If desired, both ends of the wash pipe may be provided with a series of external splines so that when one end of the wash pipe is worn from rotary contact with the packing rings 82 the wash pipe may be inverted end-to-end to present a new wearing surface.

The wash pipe 60 and packing boxes 68 and 74 may be removed laterally as a unit. This is accomplished by disconnecting the bolts 16a and unthreading the packing box 68. The packing boxes 68 and 74 are then moved axially toward each other until they lie wholly between planes defined by the ends of the wash pipe. The entire assembly may then be withdrawn laterally as a unit through one of the side openings in the support 14.

Having fully described my invention, it is to be understood that I do not wish to be limited to the details herein set forth, but my invention is of the full scope of the appended claims.

I claim:

1. In a hydraulic rotary swivel, the combination of: a rotary member having an axial fluid passage, a nonrotary member axially spaced therefrom and having a fluid passage, a tubular wash pipe for conveying fluid under pressure from one fluid passage to the other and provided with an external cylindrical wear surface, a packing assembly secured to one of said members and contacting the cylindrical wear surface near one end of the wash pipe to form a rotary seal, a series of axially extending external spline teeth on the exterior of the wash pipe at the other end thereof, the crests of the spline teeth being substantially flush with said wear surface, a ring element encircling the wash pipe, a clamp element secured to the other of said members and acting to clamp said ring element to that member, the clamp element having clearance with respect to the cylindrical wear surface on the wash pipe, a resilient seal ring continuously engaging the cylindrical wear surface and being clamped between the clamp element and the ring element, the ring element having a series of internal spline teeth engaging the series of external spline teeth on the wash pipe, both series of spline teeth being relatively short in an axial direction in comparison with the diameter of said wear surface, the interengaging series of spline teeth permitting axial and gyratory motion of the wash pipe to accommodate misalignment between said members.

2. The combination set forth in claim 1, in which the ring element is clamped to the nonrotary member.

3. The combination set forth in claim 1, in which the ring element is clamped to the rotary member.

References Cited in the file of this patent

UNITED STATES PATENTS

| | | |
|---|---|---|
| 462,222 | Shepard | Oct. 27, 1891 |
| 1,329,760 | Fulton | Feb. 3, 1920 |
| 1,512,627 | Mueller et al. | Oct. 21, 1924 |
| 1,788,500 | Uhri | Jan. 13, 1931 |
| 2,031,337 | Spalding | Feb. 18, 1936 |
| 2,053,626 | Parker | Sept. 8, 1936 |
| 2,380,681 | Wolfram | July 31, 1945 |
| 2,447,712 | Nathan | Aug. 24, 1948 |
| 2,472,061 | Bloss et al. | June 7, 1949 |
| 2,496,569 | Tremolanda | Feb. 7, 1950 |
| 2,510,414 | Philbrick | June 6, 1950 |
| 2,558,990 | Stahl | July 3, 1951 |